(12) United States Patent
Oh et al.

(10) Patent No.: US 10,322,521 B2
(45) Date of Patent: Jun. 18, 2019

(54) REALWOOD FILM, MANUFACTURING METHOD THEREOF, AND ARTICLES COMPRISING THE SAME

(71) Applicant: HYUNDAI MOBIS CO., LTD., Seoul (KR)

(72) Inventors: Woo Jeong Oh, Seoul (KR); Seong Eun Park, Yongin-si (KR); Hyeon Don Kim, Yongin-si (KR); Woo Sik Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 113 days.

(21) Appl. No.: 15/376,998

(22) Filed: Dec. 13, 2016

(65) Prior Publication Data

US 2017/0165864 A1 Jun. 15, 2017

(30) Foreign Application Priority Data

Dec. 14, 2015 (KR) .................. 10-2015-0177996

(51) Int. Cl.
*B32B 21/08* (2006.01)
*B27D 1/00* (2006.01)
(Continued)

(52) U.S. Cl.
CPC .............. *B27D 1/00* (2013.01); *B27M 1/08* (2013.01); *B32B 5/022* (2013.01); *B32B 7/04* (2013.01); *B32B 7/12* (2013.01); *B32B 21/08* (2013.01); *B32B 21/14* (2013.01); *B32B 27/12* (2013.01); *B32B 27/28* (2013.01); *B32B 27/302* (2013.01);
(Continued)

(58) Field of Classification Search
CPC ....... B32B 21/08; B32B 2317/16; B27D 1/00; B27M 1/08
See application file for complete search history.

(56) References Cited

U.S. PATENT DOCUMENTS

| | | | |
|---|---|---|---|
| 6,811,628 B1 * | 11/2004 | Reid ...................... | B29C 63/48 156/310 |
| 7,208,534 B2 * | 4/2007 | Van Rooyen ...... | C08G 18/4063 524/37 |

(Continued)

FOREIGN PATENT DOCUMENTS

| | | |
|---|---|---|
| CN | 106573582 A | 4/2017 |
| DE | 202007017218 U1 | 3/2009 |

(Continued)

OTHER PUBLICATIONS

Office Action dated Feb. 1, 2017 of corresponding German Patent Application No. 10 2016 224 791.3 and its English translation—9 pages.

(Continued)

*Primary Examiner* — Scott R. Walshon
(74) *Attorney, Agent, or Firm* — Knobbe Martens Olson & Bear LLP

(57) ABSTRACT

Disclosed are a real wood film, a manufacturing method thereof and a molded article comprising the same. The real wood film comprises: a real wood layer; and an elastic binder layer formed on the lower surface of the real wood layer, wherein the elastic binder layer comprises at least one of thermoplastic polyurethane (TPU) and acrylonitrile-butadiene-styrene (ABS) resins.

8 Claims, 4 Drawing Sheets

(51) Int. Cl.
    *B27M 1/08*     (2006.01)
    *C09D 175/04*     (2006.01)
    *C08G 18/62*     (2006.01)
    *C08G 18/73*     (2006.01)
    *B32B 5/02*     (2006.01)
    *B32B 7/04*     (2019.01)
    *B32B 7/12*     (2006.01)
    *B32B 21/14*     (2006.01)
    *B32B 27/12*     (2006.01)
    *B32B 27/28*     (2006.01)
    *B32B 27/30*     (2006.01)
    *B32B 27/32*     (2006.01)
    *B32B 27/34*     (2006.01)
    *B32B 27/36*     (2006.01)

(52) U.S. Cl.
    CPC .............. *B32B 27/32* (2013.01); *B32B 27/34* (2013.01); *B32B 27/365* (2013.01); *C08G 18/6216* (2013.01); *C08G 18/73* (2013.01); *C09D 175/04* (2013.01); *B32B 2250/04* (2013.01); *B32B 2255/08* (2013.01); *B32B 2255/26* (2013.01); *B32B 2255/28* (2013.01); *B32B 2262/0261* (2013.01); *B32B 2262/0284* (2013.01); *B32B 2270/00* (2013.01); *B32B 2307/4023* (2013.01); *B32B 2307/51* (2013.01); *B32B 2307/728* (2013.01); *B32B 2307/732* (2013.01); *B32B 2317/16* (2013.01); *B32B 2605/003* (2013.01)

(56) References Cited

U.S. PATENT DOCUMENTS

2003/0096993 A1*   5/2003   Hayoz .................. C07D 251/24
                                          544/215
2015/0165732 A1    6/2015   Lee et al.
2015/0321454 A1*   11/2015   Jinno ...................... B32B 21/08
                                          442/398

FOREIGN PATENT DOCUMENTS

| DE | 112013003103 T5 | 4/2015 | |
|---|---|---|---|
| JP | WO2016010334 A1 * | 1/2016 | ............. B32B 21/08 |
| KR | 20-0183141 Y1 | 5/2000 | |
| WO | WO-2016010334 A1 * | 1/2016 | ............... B32B 9/04 |

OTHER PUBLICATIONS

Office Action of corresponding Chinese Patent Application No. 2016111584655—5 pages (dated May 22, 2018).

* cited by examiner (a)  (b)  (c)

REALWOOD FILM, MANUFACTURING METHOD THEREOF, AND ARTICLES COMPRISING THE SAME

CROSS-REFERENCE TO RELATED APPLICATION(S)

This application claims the benefit of Korean Patent Application No. 10-2015-0177996, filed Dec. 14, 2015 in the Korean Intellectual Property Office, the entire disclosures of which are incorporated herein by reference.

BACKGROUND OF THE INVENTION

Field of the Invention

The present invention relates to a real wood film, a manufacturing method thereof and a molded article comprising the same.

Description of the Related Art

Resin molded parts are being widely used for panels near car console boxes or instrument panels and also for home appliance cases and covers.

In particular, controls and convenience features are provided in dashboards, audio decks, gear shift systems, door locks and window opening/closing units, which are mounted near driver seats and passenger seats in cars. Between the outer surface of such controls and conveniences and an interior material, an interior finish panel is installed to provide a finish. This finish panel becomes an important factor that determines the interior appearance of cars.

As described above, car finish panels have a considerable effect on the aesthetic appearance of the interior of cars. For this reason, in recent years, the demand for interior materials made of real products such as real woods has been increased in order to obtain an elegant appearance and a luxurious texture.

Meanwhile, there is a method of manufacturing an interior material using a lamination process by providing a base to be covered with a wood, forming a real wood layer on the surface of the base, and then coating and polishing the surface of the real wood layer. FIG. 1 illustrates a real wood film manufactured according to a conventional lamination process. Referring to FIG. 1, a real wood film 100 may comprise: a first wood layer 10; a first adhesive layer 11 formed on the upper surface of the first wood layer 10; a metallic layer 20 formed on the upper surface of the first adhesive layer 11; a second adhesive layer 12 formed on the upper surface of the metallic layer 20; a second wood layer 30 formed on the upper surface of the second adhesive layer 12; a third adhesive layer 13 formed on the upper surface of the second wood layer 30; and a third wood layer 40 formed on the upper surface of the third adhesive layer 13.

The first wood layer 10 and the second wood layer 30 serve to prevent the surface of the real wood film 100 from being cracked. The metallic layer 20 may be made of a thin aluminum film, and serves to facilitate formability in a press forming process. The third wood layer 40 is configured to express the texture and shape of natural wood.

However, the lamination process as described above has problems in that the process is very complicated and incurs high production costs, and in that the thickness of the manufactured real wood film is excessively large (1.5 mm or more), resulting in a decrease in the formability of the film and an increase in the weight.

Prior art documents related to the present invention include Korean Utility Model Registration No. 20-0183141 Y1 (published on May 15, 2000; entitled "Matte film structure for wood veneer).

SUMMARY OF THE INVENTION

One aspect of the present invention is directed to a real wood film. In one embodiment, the real wood film comprises: a real wood layer; and an elastic binder layer formed on the lower surface of the real wood layer, wherein the elastic binder layer comprises at least one of thermoplastic polyurethane (TPU) and acrylonitrile-butadiene-styrene (ABS) resins.

In one embodiment, the real wood film may further comprise a transparent coating layer formed on the upper surface of the real wood layer, wherein the transparent coating layer may be formed by applying and drying a transparent coating layer-forming composition comprising a first acrylic polyol resin, cellulose ester, a light stabilizer and an isocyanate-based curing agent, wherein the first acrylic polyol resin may have a glass transition temperature (Tg) between about 35° C. and about 55° C.

In one embodiment, the real wood film may further comprise a reinforcement layer formed on the lower surface of the elastic binder layer.

In one embodiment, the real wood film may further comprise an injected resin layer formed on the lower surface of the elastic binder layer.

In one embodiment, the transparent coating layer-forming composition may comprise 100 parts by weight of the first acrylic polyol resin, about 3 parts by weight to about 20 parts by weight of the cellulose ester, about 0.1 parts by weight to about 20 parts by weight of the light stabilizer, and about 0.1 parts by weight to about 15 parts by weight of the isocyanate-based curing agent.

In one embodiment, the transparent coating layer-forming composition may comprise the first acrylic polyol resin and the cellulose ester at a weight ratio of about 1:0.01 to about 1:1.

In one embodiment, the first acrylic polyol resin may have a weight-average molecular weight of about 3,500 g/mol to about 10,000 g/mol and a hydroxyl (OH) value of about 45 mg KOH/g to about 65 mg KOH/g.

In one embodiment, the transparent coating layer-forming composition may further comprise one or more of a matting agent, a curing accelerator and a solvent.

In one embodiment, the transparent coating layer-forming composition may further comprise an additive, in which the additive may comprise one or more of a leveling agent and a defoaming agent.

In one embodiment, the real wood film may further comprise a color coating layer formed between the transparent coating layer and the real wood layer, wherein the color coating layer may be formed by applying and drying a color coating layer-forming composition comprising a second acrylic polyol resin, cellulose ester, a light stabilizer, a pigment and an isocyanate-based curing agent, wherein the second acrylic polyol resin may have a glass transition temperature (Tg) between about 35° C. and about 55° C.

Another aspect of the present invention is directed to a method for manufacturing the real wood film. In one embodiment, the method for manufacturing the real wood film comprises the steps of: forming an elastic binder layer on the lower surface of a real wood sheet; and press-forming the real wood sheet having the elastic binder layer formed thereon, wherein the elastic binder layer comprises at least one of thermoplastic polyurethane (TPU) and acrylonitrile-butadiene-styrene (ABS) resins.

In one embodiment, the method for manufacturing the real wood film may further comprise a step of applying to the upper surface of the press-formed real wood sheet a transparent coating layer-forming composition comprising a first acrylic polyol resin, cellulose ester, a light stabilizer and an isocyanate-based curing agent, and drying the applied composition, thereby forming a transparent coating layer, wherein the first acrylic polyol resin may have a glass transition temperature (Tg) between about 35° C. and about 55° C.

In one embodiment, the method may further comprise, before the press-forming, a step of forming a reinforcement layer on the lower surface of the elastic binder layer.

In one embodiment, the method may further comprise, before the applying of the transparent coating layer-forming composition, a step of forming an injected resin layer on the lower surface of the elastic binder layer.

In one embodiment, the injected resin layer may be formed by a method comprising the steps of: placing the press-formed real wood sheet between an upper injection mold and a lower injection mold; closing the upper injection mold and the lower injection mold in such a manner that a space is formed between the real wood sheet and the lower injection mold; and injecting an injection resin into the space through a gate provided in the lower mold, and curing the injected resin.

In one embodiment, the method may further comprise, before the forming of the transparent coating layer, a step of applying to the upper surface of the real wood sheet a color coating layer-forming composition comprising a second acrylic polyol resin, cellulose ester, a light stabilizer, a pigment and an isocyanate-based curing agent, and drying the applied composition, thereby forming a color coating layer, wherein the second acrylic polyol resin may have a glass transition temperature (Tg) between about 35° C. and about 55° C.

Another aspect of the present invention is a molded article comprising the real wood film. In one embodiment, the molded article may be a car interior article.

It is an object of the present invention to provide a real wood film having a thin thickness, excellent processability and an excellent appearance.

Another object of the present invention is to provide a real wood film which is manufactured with high productivity and which is highly cost-effective.

Still another object of the present invention is to provide a real wood film having excellent physical strength, light resistance, moisture resistance, heat resistance, weather resistance and scratch resistance.

Still another object of the present invention is to provide a method for manufacturing the real wood film.

Yet another object of the present invention is to provide a molded article comprising the real wood film.

When the real wood film according to the present invention is applied, the process for manufacturing the real wood film may be simplified compared to a conventional real wood film manufacturing process, so that the real wood film may be manufactured to have a thin film. Furthermore, the real wood film according to the present invention has excellent processability, is significantly light in weight, is manufactured with high productivity, and is manufactured at reduced costs so as to be cost-effective. In addition, the real wood film according to the present invention may exhibit excellent physical strength, light resistance, moisture resistance, heat resistance, weather resistance and scratch resistance.

DESCRIPTION OF SPECIFIC EMBODIMENTS

Figure 1:
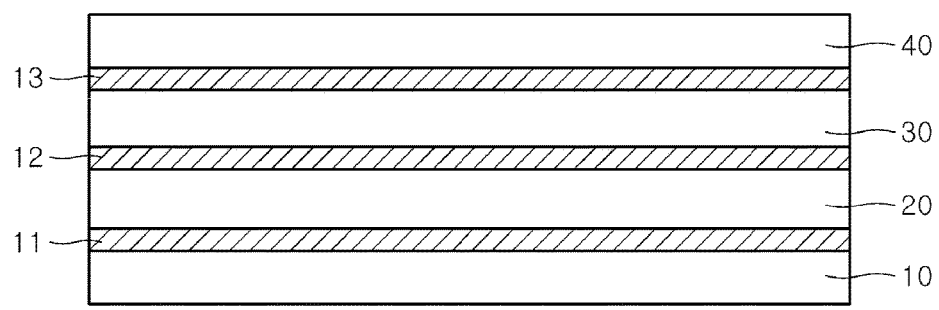
FIG. 1 illustrates a conventional real wood film.

Hereinafter, embodiments of the present invention will be described in detail with reference to the accompanying drawings so that they can be easily practiced by those skilled in the art to which the present invention pertains. The present invention may, however, be embodied in many different forms and should not be construed as being limited to the embodiments set forth herein. In the drawings, parts regardless of description are omitted to clearly describe the present invention. Like reference numerals are used to refer to like elements throughout the specification.

As used herein, the terms "upper" and "lower" are used with respect to the drawings. According to the angle of view, "upper" may be changed to "lower", and vice versa.

Real Wood Film

One aspect of the present invention is directed to a real wood film.

Figure 2:
FIG. 2 illustrates a real wood film according to an embodiment of the present invention.

FIG. 2 illustrates a real wood film according to an embodiment of the present invention. Referring to FIG. 2, a real wood film 200 comprises: a real wood layer 130; and an elastic binder layer 120 formed on the lower surface of the real wood layer 120.

Real Wood Layer

The real wood layer 130 is also referred to as a wood veneer layer, and serves to impart the pattern shape and texture of natural wood to the surface of the real wood film 200 and to give an aesthetic appearance to the user. This real wood layer 130 is in the form of a veneer sheet obtained by slicing a wood veneer that is laminated natural wood.

In one embodiment, the real wood layer 130 may have a thickness of about 0.1 mm to about 1 mm. At this thickness, the real wood layer may have an excellent appearance, and the back side of the real wood layer 130 may be prevented from showing through. For example, the real wood layer 130 may have a thickness of about 0.3 mm to about 0.4 mm.

Elastic Binder Layer

The elastic binder layer 120 serves to impart elasticity to the real wood layer 200 and to prevent cracking caused by the shrinkage and expansion of the real wood layer 130 while preventing the backside of the real wood layer 130 from showing through. In addition, it also functions as a binder capable of bonding with a resin which is injected onto the lower surface of the real wood film 200 during manufacture of a molded article as described below.

In one embodiment, the elastic binder layer 120 comprises at least one of thermoplastic polyurethane (TPU) and acrylonitrile-butadiene-styrene (ABS) resins. When this kind of resin is used, the elastic binder layer 120 may have both excellent elastic and adhesive properties to prevent the real wood layer 130 from being damaged by external impact and from being cracked by shrinkage and expansion, and may also be easily bonded to a resin as described below.

In addition, when the elastic binder layer 120 is molded in a state laminated with the real wood layer, it is prevented from being damaged in molding processes such as pressing and injection molding, and also functions to impart flexibility to the real wood sheet. In addition, a plurality of wood layers and a metallic layer, which are applied in a conventional art, can be omitted, and thus the weight and thickness of the real wood sheet may be reduced, resulting in an increase in lightweight properties and cost effectiveness.

In one embodiment, the elastic binder layer 120 may have a thickness of about 0.1 mm to about 1 mm. At this thickness, the elastic binder layer 120 may have an excellent adhesive property, impart elasticity to the real wood film 200, and prevent damage (e.g., cracking) to the real wood film, and the real wood film 200 may have a minimized thickness and an increased formability. For example, the elastic binder layer 120 may have a thickness of about 0.3 mm to about 0.4 mm.

In one embodiment, the real wood film 200 may have a thickness ranging from about 0.7 mm to about 1 mm. In this thickness range, the real wood film 200 has an excellent lightweight property and cost effectiveness while exhibiting excellent formability (such as curve processing) in manufacture of a molded article. For example, the thickness may be about 0.8 mm to about 0.9 mm.

Figure 3:
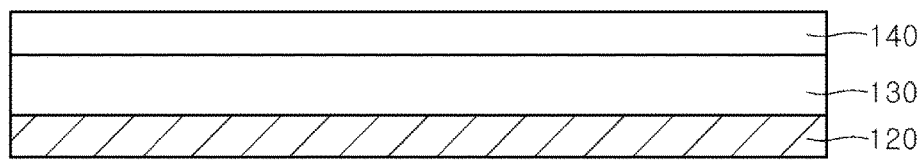
FIG. 3 illustrates a real wood film according to another embodiment of the present invention.

FIG. 3 illustrates a real wood film according to another embodiment of the present invention. Referring to FIG. 3, a real wood film 300 may further comprise a transparent coating layer 140 formed on the upper surface of the real wood layer 130. The transparent coating layer 140 may be formed by applying and drying a transparent coating layer-forming composition comprising a first acrylic polyol resin, cellulose ester, a light stabilizer and an isocyanate-based curing agent, in which the first acrylic polyol resin may have a glass transition temperature (Tg) between about 35° C. and about 55° C.

Transparent Coating Layer

The transparent coating layer 140 may be contained for the purposes of ensuring the physical strength, light resistance, weather resistance and scratch resistance of the real wood film and improving the appearance of the real wood film.

In one embodiment, the transparent coating layer 140 may be formed by applying to the upper surface of the real wood layer 130 a transparent coating layer-forming composition comprising a first acrylic polyol resin, cellulose ester, a light stabilizer and an isocyanate-based curing agent, and drying the applied composition.

Transparent Coating Layer-Forming Composition

The transparent coating layer-forming composition may comprise a first acrylic polyol resin, cellulose ester, a light stabilizer and an isocyanate-based curing agent. The transparent coating layer-forming composition may be either a one-pack type composition comprising the above-described components, or a two-pack type composition consisting of: a first pack comprising the above-described first acrylic polyol resin, cellulose ester and light stabilizer; and a second pack comprising the isocyanate-based curing agent. For example, it may be a two-pack type composition.

In one embodiment, the transparent coating layer-forming composition may comprise 100 parts by weight of the first acrylic polyol resin, about 3 parts by weight to about 20 parts by weight of the cellulose ester, about 0.1 parts by weight to about 20 parts by weight of the light stabilizer, and about 0.1 parts by weight to about 15 parts by weight of the isocyanate-based curing agent.

In another embodiment, the transparent coating layer-forming composition may comprise 100 parts by weight of the first acrylic polyol resin, about 3 parts by weight to about 25 parts by weight of the cellulose ester, about 5 parts by weight to about 15 parts by weight of the light stabilizer, and about 5 parts by weight to about 15 parts by weight of the isocyanate-based curing agent.

Hereinafter, the components of the transparent coating layer will be described in detail.

First Acrylic Polyol Resin

The first acrylic polyol resin is contained for the purpose of ensuring the adhesive strength, scratch resistance, light resistance, moisture resistance, heat resistance and anti-shrinkage properties of the transparent coating layer which is attached to the upper surface of the real wood layer.

The first acrylic polyol resin that is used in the present invention may be a thermosetting acrylic polyol resin prepared by a conventional method. For example, it may be prepared by copolymerizing one or more monomers selected from among aromatic vinyl-based monomers, hydroxyl group-containing acrylic monomers, and alkyl group-containing acrylic monomers.

In one embodiment, aromatic vinyl-based monomers include, but are not limited to, styrene, α-methyl styrene and vinyl toluene. These monomers may be used alone or in combination of two or more.

In one embodiment, the hydroxyl group-containing acrylic monomers include, but are not limited to, 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethyleneglycol mono(meth)acrylate, 1,6-hexanediol mono(meth)acrylate, 2-hydroxy-3-phenyloxypropyl (meth)acrylate, 4-hydroxycyclohexyl (meth)acrylate, and 2-hydroxy-3-phenyloxy (meth)acrylate. These monomers may be used alone or in combination of two or more.

As used herein, the term "(meth)acrylate" means "acrylate" and "methacrylate", and the term "(meth)acrylic acid" means "acrylic acid" and "(meth)acrylic acid".

In one embodiment, the alkyl group-containing acrylic monomers include, but are not limited to, methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate. These monomers may be used alone or in combination of two or more. As used herein, the term "alkyl" means a $C_1$-$C_{20}$ alkyl.

In an embodiment of the present invention, the monomer mixture may further comprise a monomer copolymerizable with the above-described monomer component. For example, it may further comprise a carboxyl group-containing acrylic monomer. In one embodiment, examples of the carboxyl group-containing acrylic monomer include, but are not limited to, (meth)acrylic acid, fumaric acid, itaconic acid and maleic acid. These monomers may be used alone or in combination of two or more.

In one embodiment, the first acrylic polyol resin may be prepared by copolymerizing one or more monomers selected from among styrene monomers, butyl (meth)acrylate, hexaethyl (meth)acrylate, (meth)acrylic acid, and methyl (meth) acrylate.

In one embodiment, the first acrylic polyol resin may have a solid content of about 40% to about 60%. In this solid content range, workability in the process of forming the transparent coating layer, and the smoothness and physical properties of the coating layer, may be excellent. For example, the solid content may be about 45% to about 55%.

In one embodiment, the first acrylic polyol resin may have a hydroxyl (OH) value of about 45 mg KOH/g to about 65 mg KOH/g on a solid basis. In this hydroxyl value range, the transparent coating layer-forming composition may have excellent compatibility with other components, the curing rate thereof may be easily controlled to improve workability, and the crosslinking density thereof after curing may be increased to improve the physical strength and chemical resistance of the transparent coating layer. For example, the hydroxyl value may be about 50 mg KOH/g to about 60 mg KOH/g.

In one embodiment, the first acrylic polyol resin may have a glass transition temperature (Tg) ranging from about 35° C. to about 55° C. In this range, the deformation of the transparent coating layer may be minimized due to its excellent physical strength, heat resistance, moisture resistance and shrinkage resistance, and the transparent coating layer may have excellent adhesive properties, and thus exfoliation of the coating layer or surface defects such as grain bursting of the real wood layer may be prevented. For example, the glass transition temperature (Tg) may be about 35, 36, 37, 38, 39, 40, 41, 42, 43, 44, 45, 46, 47, 48, 49, 50, 51, 52, 53, 54 or 55° C.

In one embodiment, the first acrylic polyol resin may have a weight-average molecular weight ranging from about 3,500 g/mol to about 10,000 g/mol. In this range, the transparent coating layer may have excellent physical strength. For example, the weight-average molecular weight may range from about 6,500 g/mol to about 7,500 g/mol.

Cellulose Ester

The cellulose ester that is used in the present invention is contained for the purposes of easy formation of a coating layer from the transparent coating layer-forming composition, viscosity adjustment, prevention of shrinkage and splitting of the transparent coating layer, and increasing the adhesion between layers.

In one embodiment, the cellulose ester may be an aliphatic cellulose ester in which an aliphatic acyl group is introduced into the hydroxyl group of cellulose. In one embodiment, the aliphatic acyl group may be a $C_1$-$C_{10}$ aliphatic acyl group. For example, the aliphatic acyl group may be an acetyl group, a propionyl group, a butyryl group, a pentanoyl group or a hexanoyl group.

In one embodiment, the cellulose ester may be cellulose acetate, cellulose propionate, cellulose butyrate, cellulose acetate propionate, or cellulose acetate butyrate. For example, the cellulose ester may be cellulose acetate butyrate (CAB). In one embodiment, the cellulose acetate butyrate may be selected from among CAB-551-0.01, CAB-551-0.2, CAB-553-0.4, CAB-531-1, CAB-500-5, CAB-381-0.1, CAB-381-0.5, CAB-381-2, CAB-381-2BP, CAB-381-20 and CAB-381-20BP, manufactured by Eastman.

In one embodiment, the cellulose ester may be contained in an amount of about 3 parts by weight to about 20 parts by weight based on 100 parts by weight of the first acrylic polyol resin. When the cellulose ester is contained in this content range, the drying rate of the transparent coating layer-forming composition may be easily controlled, and the hardness of the coating layer will not excessively increase, and thus bursting of the coating layer or an decrease in the physical strength of the coating layer may be prevented. For example, the cellulose ester may be contained in an amount of about 3 parts by weight to about 15 parts by weight. For example, it may be contained in an amount of about 3, 4, 5, 6, 7, 8, 9, 10, 11, 12, 13, 14, 15, 16, 17, 18, 19 or 20 parts by weight.

In one embodiment, the transparent coating layer-forming composition may comprise the first acrylic polyol resin and the cellulose ester at a weight ratio ranging from about 1:0.01 to about 1:1. In this weight ratio, the miscibility between the components of the transparent coating layer-forming composition and the workability of the composition during formation of the transparent coating layer will be excellent, and the transparent coating layer formed will have excellent physical strength. For example, the transparent coating layer-forming composition may comprise the first acrylic polyol resin and the cellulose ester at a weight ratio of about 1:0.05 to about 1:0.2.

Light Stabilizer

The light stabilizer is contained for the purpose of preventing surface defects (such as discoloration) of the real wood layer and improving the weather resistance of the transparent coating layer. In one embodiment, the stabilizer used may be an amine-based stabilizer (or a hindered amine light stabilizer (HALS)), a triazine light stabilizer or a benzotriazole light stabilizer.

In one embodiment, examples of the amine light stabilizer include, but are not limited to, piperidinyl ester, oxazolidines, piperidinooxazolidines, piperidinespiroacetals, and diazacycloalkanones. Further specific examples of the amine light stabilizer include, but are not limited to, bis(2,2,6,6-tetramethyl-4-piperidyl)sebacate, bis(1,2,2,6,6-pentamethyl-4-piperidyl)sebacate, methyl 1,2,2,6,6-pentamethyl-4-piperidyl sebacate, bis(1-octyloxy -2,2,6,6-tetramethyl-4-piperidyl)sebacate, and 2-(3,5-di-t-butyl-4-hydroxybenzyl)-2-n-butylmalonic acid bis(1,2,2,6,6-pentamethyl-4-piperidyl).

In one embodiment, examples of the benzotriazole light stabilizer include, but are not limited to, 2-(2H-benzotriazol-2-yl)-4-(1,1,3,3-tetramethylbutyl)phenol, 2-(5-chloro-2H-benzotriazol-2-yl)-4,6-bis(1,1-dimethylethyl)-phenol, 2-(2-hydroxy-5-methylphenyl)benzotriazole, 2-[2-hydroxy-3-(3,4,5,6-tetrahydrophthalimide-methyl)-5-methylphenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl3-(3-(2H-benzotriazol-2-yl)-5-tert-tert-4-hydroxyphenyl) propionate and polyethylene glycol, and 2-(2H-benzotriazol-2-yl)-6-dodecyl-4-methyl phenol.

In one embodiment, examples of the triazine light stabilizer include, but are not limited to, benzotriazine and 2-(4,6-diphenyl-1,3,5-triazin-2-yl)-5-[(hexyl)oxy]phenol.

In one embodiment, examples of the light stabilizer include, but are not limited to, Tinuvin 1130, 292, 99-2 and 477 manufactured by BASF, Tinuvin 1130, 292, 99-2 and 477 manufactured by Everlight Group, and Eversorb 80 and 93 manufactured by Everlight Group.

In one embodiment, the light stabilizer may be contained in an amount ranging from about 0.1 parts by weight to about 20 parts by weight based on 100 parts by weight of the first acrylic polyol resin. In this range, the transparent coating layer will have excellent weather resistance, and discoloration of the real wood layer and the transparent coating layer may be prevented. For example, the light stabilizer may be contained in an amount of about 5 parts by weight to about 15 parts by weight. For example, the light stabilizer may be contained in an amount of 0.1, 1, 2, 3, 4, 5, 6, 7, 8, 9, 10, 11, 12, 13, 14, 15, 16, 17, 18, 19 or 20 parts by weight.

Isocyanate-Based Curing Agent

The isocyanate-based curing agent forms a urethane bond by a reaction with the hydroxyl group of the acrylic polyol resin.

In one embodiment, the isocyanate-based curing agent used may be a polyisocyanate-based curing agent. The polyisocyanate-based curing agent may mean a curing agent containing 3 or more isocyanate groups per molecule. The polyisocyanate-based curing agent may comprise one or more of hexa methylene diisocyanate, trimethylhexa methyl diisocyanate, isophorone diisocyanate, 4,4'-dicyclohexylmethane diisocyanate, and tetramethylxylene diisocyanate. For example, the isocyanate-based curing agent may be hexamethylene diisocyanate.

In other embodiments of the present invention, the curing agent may be used after dilution in a solvent. In one embodiment, the solvent may comprise one or more of acetate-based solvents, ketone-based solvents, aromatic hydrocarbon-based solvents, and alcohol-based solvents.

Examples of the acetate-based solvents include, but are not limited to, ethyl acetate, n-butyl acetate, cellosolve acetate, propylene glycol monomethyl acetate, and propylene glycol monomethyl ether acetate (PM acetate).

Examples of the ketone-based solvents include, but are not limited to, acetone, methyl ethyl ketone, and methyl isobutyl ketone.

Examples of the aromatic hydrocarbon-based solvents include, but are not limited to, xylene, toluene and hexane. Specifically, the aromatic hydrocarbon-based solvents include Solvesso #100 and Solvesso #150, which are commercially available from Esso Standard Oil.

Examples of the alcohol-based solvents include, but are not limited, isopropyl alcohol, ethanol and methanol.

In one embodiment, the isocyanate-based curing agent may be mixed with the solvent at a weight ratio ranging from about 1:0.5 to about 1:5. In this mixing ratio, miscibility and workability during formation of the transparent coating layer will be excellent.

The isocyanate-based curing agent may be contained in an amount of about 0.5 parts by weight to 20 parts by weight based on 100 parts by weight of the first acrylic polyol resin. In this content range, the transparent coating layer may have excellent durability, moisture resistance and impact resistance, and drying rate during formation of the transparent coating layer will be excellent. For example, the isocyanate-based curing agent may be contained in an amount of about 5 parts by weight to about 15 parts by weight. For example, it may be contained in an amount of about 0.5, 1, 2, 3, 4, 5, 6, 7, 8, 9, 10, 11, 12, 13, 14, 15, 16, 17, 18, 19 or 20 parts by weight.

In other embodiments of the present invention, the transparent coating layer-forming composition may further comprise one or more of a matting agent, a curing accelerator and a solvent.

Matting Agent

The matting agent is contained for the purpose of reducing the gloss of the transparent coating layer to ensure an elegant appearance. In one embodiment, the matting agent may comprise a silica-based matting agent. In one embodiment, the silica-based matting agent used may have a size of about 2 μm to about 4 μm. Herein, the size means the greatest size. Commercial products that may be used as the matting agent include Syloid C503, C803, ED30 and 7000 (Grace, USA).

The matting agent may be contained in an amount ranging from about 3 parts by weight to about 15 parts by weight based on 100 parts by weight of the first acrylic polyol resin. In this content range, the matting agent will not deteriorate the physical properties of the transparent coating layer while it may suitably adjust the gloss of the transparent coating layer to make the appearance better. For example, the matting agent may be contained in an amount of about 3 parts by weight to about 12 parts by weight. For example, it may be contained in an amount of about 3, 4, 5, 6, 7, 8, 9, 10, 11, 12, 13, 14 or 15 parts by weight.

Curing Accelerator

The curing accelerator may serve to control drying rate during formation of the transparent coating layer. The curing accelerator may comprise one or more of tin metal compounds, zinc metal compounds, amine compounds, titanium metal compounds, bismuth metal compounds, and aluminum metal compounds. For example, the curing accelerator may comprise a tin metal compound. In an embodiment, the curing accelerator may comprise an organometallic tin compound.

In one embodiment, the tin-based organometallic compound may comprise one or more of dimethyltin dioleate, dimethyltin dilaurate, dibutyltin dioleate, diphenyltin diacetate, dibutyltin oxide, dibutyltin dimethoxide, dibutylbis (triethoxysiloxy)tin, and dioctyltin dilaurate. For example, it may comprise dibutyl tin dilaurate (DBTL).

The curing accelerator may be contained in an amount ranging from about 0.001 parts by weight to about 5 parts by weight based on 100 parts by weight of the first acrylic polyol resin. In this content range, the pot life of the composition will not be excessively short, and the drying property of the composition will be improved to make workability better. For example, the curing accelerator may be contained in an amount of about 0.01 parts by weight to about 0.3 parts by weight. For example, it may be contained in an amount of about 0.001, 0.01, 0.05, 0.1, 0.5, 1, 2, 3, 4 or 5 parts by weight.

Solvent

The solvent may be contained for the purpose of maintaining the thickness of the transparent coating layer and ensuring the miscibility and workability of the components of the transparent coating layer-forming composition.

In one embodiment, the solvent may comprise one or more of acetate-based solvents, ketone-based solvents, aromatic hydrocarbon-based solvents, and alcohol-based solvents.

Examples of the acetate-based solvents include, but are not limited to, ethyl acetate, n-butyl acetate, cellosolve acetate, propylene glycol monomethyl acetate, and propylene glycol monomethyl ether acetate.

Examples of the ketone-based solvents include, but are not limited to, acetone, methyl ethyl ketone, and methyl isobutyl ketone.

Examples of the aromatic hydrocarbon-based solvents include, but are not limited to, xylene, toluene and hexane. Specifically, the aromatic hydrocarbon-based solvents include Solvesso #100 and Solvesso #150, which are commercially available from Esso Standard Oil.

Examples of the alcohol-based solvents include, but are not limited, isopropyl alcohol, ethanol and methanol.

In one embodiment, the solvent may be contained in an amount ranging from about 30 parts by weight to about 150 parts by weight based on 100 parts by weight of the first acrylic polyol resin. When the solvent is contained in this content range, the workability and the appearance of the transparent coating layer will be excellent, and the flowing down of the composition during formation of the transparent coating layer may be prevented. For example, the solvent may be contained in an amount of about 55 parts by weight to about 95 parts by weight. For example, it may be contained in an amount of 30, 35, 40, 45, 50, 55, 60, 65, 70, 75, 80, 85, 90, 95, 100, 110, 120, 130, 140 or 150 parts by weight.

In other embodiments, the transparent coating layer-forming composition may further comprise an additive.

Additive

The additive may be contained for the purpose of improving the workability, appearance and physical strength of the transparent coating layer.

In one embodiment, the additive may comprise one or more of a leveling agent and a defoaming agent.

The leveling agent may be contained for the purpose of ensuring the smoothness (leveling property) of the transparent coating layer. The leveling agent that is used in the present invention may be a polyether-modified polysiloxane or fluoroacrylate-based leveling agent, etc.

The defoaming agent may be contained for the purpose of preventing foam generation during formation of the transparent coating layer. The defoaming agent used may be a mineral oil-based or non-silicon-based defoaming agent, etc.

In one embodiment, the additive may be contained in an amount ranging from 0.1 parts by weight to about 8 parts by weight based on 100 parts by weight of the first acrylic polyol resin. When the additive is contained in this content range, it will exhibit excellent leveling and defoaming properties without causing defects (such as cratering) on the surface of the transparent coating layer. For example, the additive may be contained in an amount of about 0.1, 0.5, 1, 2, 3, 4, 5, 6, 7 or 8 parts by weight.

In one embodiment, the transparent coating layer 140 may be formed to have a thickness ranging from about 1 μm to about 500 μm. In this thickness range, the transparent coating layer may easily protect the surface of the real wood film, and may have excellent scratch resistance, weather resistance, water resistance, light resistance and chemical resistance. For example, the transparent coating layer may be formed to have a thickness of about 15 μm to about 50 μm. As another example, it may be formed to have a thickness of about 20 μm to about 25 μm.

Figure 4:
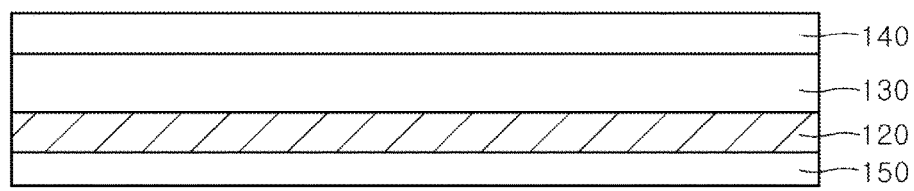
FIG. 4 illustrates a real wood film according to still another embodiment of the present invention.

FIG. 4 illustrates a real wood film according to still another embodiment of the present invention.

Referring to FIG. 4, a real wood film 400 according to still another embodiment of the present invention may further comprise a reinforcement layer 150 formed on the lower surface of the elastic binder layer 120.

Reinforcement Layer

The reinforcement layer 150 is bonded with the injected resin of the elastic binder layer 120 to be described later, and functions to impart rigidity to the real wood film 400. In addition, the reinforcement layer 150 may function as a metal member such as an aluminum sheet.

The reinforcement layer 150 may be made of a non-woven fabric. When the non-woven fabric is used, the real wood film may have excellent formability and physical strength. The non-woven fabric may have a density of about 1 g/m$^3$ to about 200 g/m$^3$. At this density, the real wood film 400 may have excellent formability and physical strength.

In one embodiment, the non-woven fabric may be manufactured using one or more of polyethylene terephthalate (PET) and nylon. In one embodiment, the non-woven fabric used may be a spunbond needle-punched nonwoven fabric. When a nonwoven fabric is used, the real wood film 400 may have excellent formability and physical property.

In one embodiment, the reinforcement layer 150 may have a thickness ranging from about 0.05 mm to about 0.5 mm. In this thickness range, the real wood film may have both excellent rigidity and formability. For example, the thickness may be about 0.15 mm to about 0.25 mm.

Color Coating Layer

Figure 5:
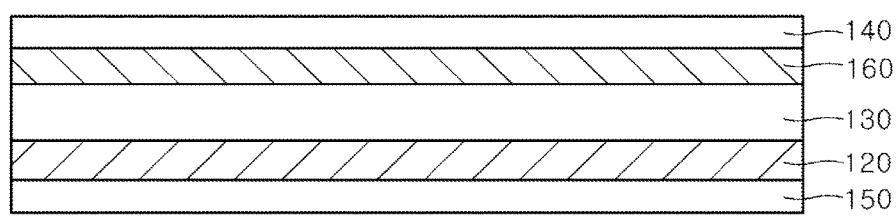
FIG. 5 illustrates a real wood film according to still another embodiment of the present invention.

In still another embodiment of the present invention, the real wood film may further comprise a color coating layer. FIG. 5 illustrates a real wood film according to still another embodiment of the present invention. Referring to FIG. 5, a real wood film 500 according to according to still another embodiment of the present invention may further comprise a color coating layer 160 formed between the transparent coating layer 140 and the real wood layer 130.

The color coating layer 160 may be included for the purpose of improving the appearance of the real wood film and preventing discoloration and surface defects (such as grain bursting or splitting) of the real wood layer from occurring under various environmental conditions. In one embodiment, the color coating layer 160 may be formed by applying to the upper surface of the real wood layer 130 a color coating layer-forming composition comprising a second acrylic polyol resin, cellulose ester, a pigment and an isocyanate-based curing agent, and curing the applied composition.

Color Coating Layer-Forming Composition

The color coating layer-forming composition comprises a second acrylic polyol resin, cellulose ester, a light stabilizer, a pigment and an isocyanate-based curing agent, and curing the applied composition. In one embodiment, the color coating layer-forming composition used may be a one-pack type composition comprising the above-described components. In other embodiments, color coating layer-forming composition used may be a two-pack type composition consisting of: a first pack comprising the second acrylic polyol resin, the cellulose ester, the light stabilizer and the pigment; and a second pack comprising the isocyanate-based curing agent. For example, it may be a two-pack type composition. When the color coating layer is formed using the color coating layer-forming composition, the composition will be dried quickly, and the color coating layer will have excellent adhesion to the upper surface of the real wood layer, may protect the real wood layer, and may serve to mediate the adhesion between the transparent coating layer 140 and the real wood layer 130.

In one embodiment, the color coating layer-forming composition may comprises 100 parts by weight of the second acrylic polyol resin, about 3-20 parts by weight of the cellulose ester, about 0.1 parts by weight to about 20 parts by weight of the light stabilizer, about 10 parts by weight to about 40 parts by weight of the pigment, and 0.1 parts by weight to about 15 parts by weight of the isocyanate-based curing agent.

In another embodiment, the color coating layer-forming composition may comprises 100 parts by weight of the second acrylic polyol resin, about 3 parts by weight to about 15 parts by weight of the cellulose ester, about 5 parts by weight to about 15 parts by weight of the light stabilizer, about 15 parts by weight to about 25 parts by weight of the pigment, and about 5 parts by weight to about 15 parts by weight of the isocyanate-based curing agent.

Hereinafter, the components of the color coating layer-forming composition will be described in further detail.

Second Acrylic Polyol Resin

The second acrylic polyol resin is contained for the purpose of ensuring the adhesive strength, scratch resistance, light resistance, moisture resistance, heat resistance and shrinkage resistance of the coating layer. In one embodiment, the second acrylic polyol resin used may be the same as the first acrylic polyol resin as described above. In one embodiment, the second acrylic polyol resin may have a glass transition temperature (Tg) ranging from about 35° C. to about 55° C. In this glass transition temperature range, the color coating layer may have excellent physical strength, heat resistance, moisture resistance and shrinkage resistance, deformation of the color coating layer may be minimized, and the color coating layer may have excellent adhesive strength so that exfoliation of the coating layer or surface defects (such as grain bursting) of the real wood layer may be prevented. For example, the glass transition temperature may be about 35, 36, 37, 38, 39, 40, 41, 42, 43, 44, 45, 46, 47, 48, 49, 50, 51, 52, 53, 54 or 55° C.

Cellulose Ester

The cellulose ester is contained for the purpose of easy formation of a coating layer from the color coating layer-forming composition, viscosity adjustment, prevention of shrinkage and splitting of the coating layer, and increasing the adhesion between the coating layers. The cellulose ester used may be the same cellulose ester as described above, and the detailed description thereof is omitted.

In one embodiment, the cellulose ester may be contained in an amount ranging from about 2 parts by weight to about 20 parts by weight based on 100 parts by weight of the second acrylic polyol resin. When the cellulose ester is contained in this content range, the drying rate of the color coating layer-forming composition may be easily controlled, and the hardness of the color coating layer will not excessively increase so that a reduction in the physical strength of the color coating layer may be prevented. For example, the cellulose ester may be contained in an amount of about 3 parts by weight to about 15 parts by weight. For example, it may be contained in an amount of about 2, 3, 4, 5, 6, 7, 8, 9, 10, 11, 12, 13, 14, 15, 16, 17, 18, 19 or 20 parts by weight.

In one embodiment, the color coating layer-forming composition may comprise the second acrylic polyol resin and the cellulose ester at a weight ratio ranging from about 1:0.01 to about 1:1. In this weight ratio, the components of the color coating layer-forming composition will have excellent miscibility and workability during formation of the color coating layer, and the color coating layer formed may have excellent physical strength. For example, the second acrylic polyol resin and the cellulose ester may be contained at a weight ratio of about 1:0.05 to about 1:0.2.

Light Stabilizer

The light stabilizer is contained for the purpose of preventing surface defects (such as discoloration) of the real wood layer of the present invention and improving the weather resistance of the color coating layer. The light stabilizer used may be the same cellulose ester as described above, and the detailed description thereof is omitted.

In one embodiment, the light stabilizer may be contained in an amount ranging from about 0.1 parts by weight to about 20 parts by weight based on 100 parts by weight of the second acrylic polyol resin. In this content range, the color coating layer may have excellent weather resistance while discoloration of the color coating layer may be prevented.

For example, the light stabilizer may be contained in an amount of about 5 parts by weight to about 15 parts by weight. For example, it may be contained in an amount of about 0.1, 1, 2, 3, 4, 5, 6, 7, 8, 9, 10, 11, 12, 13, 14 or 15 parts by weight.

Pigment

The pigment is contained for the purpose of imparting a color to the real wood film of the present invention to improve the appearance of the real wood layer and preventing the real wood layer from being discolored upon exposure to an external environment.

In one embodiment, examples of the pigment include, but are not limited to, copper (Cu), copper oxide (CuO or $Cu_2O$), quinophthalone yellow, isoindoline, quinacridone, phthalocyanine, dioxanzine, calcium carbonate ($CaCO_3$), 4-diketo-3,6-diphenyl-pyrrolo-[3,4c]-pyrrole (DPP), carbon black, titanium dioxide ($TiO_2$), and iron oxide ($Fe_2O_3$). These pigments may be used along or in combination of two or more in order to impart a desired color by the user.

In one embodiment, commercial products that may be used as the pigment include SAP BLACK 720, 790, B-780, SAP YELLOW 105, 170, SAP RED 623, 690, SCP BLACK 7803, 7931H, B-7781, SCP YELLOW 1627H, 1758H and SCP RED 6105, which are commercially available from Ilsam, and NSP-VG RED 101(D), 105(D), 152(D), NSP-VG YELLOW 302(E), 306(D), 375(D), NSP-VG BLACK 803 (C), 805(C), NSP-CZ RED 101(D), 115(D), 120(D), NSP-CZ YELLOW 306(D), 308(D), NSP-CZ BLACK 805(D), 807(D), 808(D), NSP-AY RED 101C, 123A, NSP-AY YELLOW 306B, 320A, NSP-AY BLACK 805B and 813C, which are commercially available from NIKKO BICS.

In one embodiment, the pigment may be contained in an amount ranging from about 10 parts by weight to about 40 parts by weight based on 100 parts by weight of the second acrylic polyol resin. In this content range, the color coating layer may be formed to have a suitable thickness that does not reduce the durability thereof, while the composition may have excellent miscibility and workability and the color coating layer may have excellent appearance. For example, the pigment may be contained in an amount of about 15 parts by weight to about 25 parts by weight. For example, it may be contained in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 parts by weight.

Isocyanate-Based Curing Agent

The isocyanate-based curing agent reacts with the hydroxyl group of the second acrylic polyol resin to form a urethane bond to thereby increase the physical strength of the color coating layer. The isocyanate-based curing agent used may be the same as described above, and thus the detailed description thereof is omitted.

In other embodiments of the present invention, the isocyanate-based curing agent may be used after dilution in a solvent. In one embodiment, the solvent used may comprise one or more of acetate-based solvents, ketone-based solvents, aromatic hydrocarbon-based solvents and alcohol-based solvents as described above.

In one embodiment, the isocyanate-based curing agent may be mixed with the solvent at a weight ratio ranging from 1:0.5 to about 1:5. In this mixing ratio range, the color coating layer-forming composition may have excellent miscibility and workability during formation of the color coating layer.

In one embodiment, the isocyanate-based curing agent may be contained in an amount ranging of about 0.5 parts to about 20 parts by weight based on 100 parts by weight of the second acrylic polyol resin. In this content range, the color coating layer may have excellent durability, moisture resistance and impact resistance, and drying rate during formation of the color coating layer will be excellent. For example, the isocyanate-based curing agent may be contained in an amount of about 5 parts by weight to about 15 parts by weight. For example, it may be contained in an amount of about 0.5, 1, 2, 3, 4, 5, 6, 7, 8, 9, 10, 11, 12, 13, 14, 15, 16, 17, 18, 19 or 20 parts by weight.

In other embodiments of the present invention, the color coating layer-forming composition may further comprise one or more of a polishing agent, a curing accelerator and a solvent.

Polishing Agent

In the present invention, polishing is performed in order to remove foreign matter from the surface of the real wood layer and to improve the smoothness and adhesion of the surface of the color coating layer. The polishing agent may serve to facilitate the polishing.

In one embodiment, the polishing agent may comprise zinc stearate. Commercial products that may be used as the polishing agent include, but are not limited to, ZN-ST (GP) (Shinwon Industry Co., Ltd., Korea), SAK-ZS-PLB (SILVER FERN) and ZN-ST (ST-7) (Seoul Fine Chemical Industry Co., Ltd., Korea).

In one embodiment, the polishing agent may be contained in an amount ranging from about 1 part by weight to about 10 parts by weight based on 100 parts by weight of the second acrylic polyol resin. In this content range, the polishing agent will exhibit excellent polishing ability without causing whitening of the color coating layer. For example, the polishing agent may be contained in an amount of about 2 parts by weight to about 8 parts by weight. For example, it may be contained in an amount of about 1, 2, 3, 4, 5, 6, 7, 8, 9 or 10 parts by weight.

Curing Accelerator

The curing accelerator may serve to control drying rate during formation of the color coating layer. The curing accelerator may comprise one or more of tin metal compounds, zinc metal compounds, amine compounds, titanium metal compounds, bismuth metal compounds, and aluminum metal compounds. For example, the curing accelerator may comprise a tin metal compound. In an embodiment, the curing accelerator may comprise a tin-based organometallic compound. The tin-based organometallic compound may be the same as described above.

The curing accelerator may be contained in an amount ranging from about 0.001 parts by weight to about 5 parts by weight based on 100 parts by weight of the second acrylic polyol resin. In this content range, the pot life of the composition will not be excessively short, and the drying property of the composition will be improved to make workability better. For example, the curing accelerator may be contained in an amount of about 0.01 parts by weight to about 0.3 parts by weight. For example, it may be contained in an amount of about 0.001, 0.01, 0.05, 0.1, 0.5, 1, 2, 3, 4 or 5 parts by weight.

Solvent

The solvent may be contained for the purpose of maintaining the thickness of the color coating layer and ensuring the miscibility and workability of the components of the color coating layer-forming composition.

In one embodiment, the solvent used may be the same as described above.

In one embodiment, the solvent may be contained in an amount ranging from about 30 parts by weight to about 150 parts by weight based on 100 parts by weight of the second acrylic polyol resin. When the solvent is contained in this content range, the workability and the appearance of the transparent coating layer will be excellent, and the flowing down of the composition during formation of the transparent coating layer may be prevented. For example, the solvent may be contained in an amount of about 45 parts by weight to about 85 parts by weight. For example, it may be contained in an amount of about 30, 35, 40, 45, 50, 55, 60, 65, 70, 75, 80, 85, 90, 95, 100, 110, 120, 130, 140 or 150 parts by weight.

In other embodiments, the color coating layer-forming composition may further comprise an additive.

Additive

The additive may be contained for the purpose of improving the workability, appearance and physical strength of the color coating layer. In one embodiment, the additive used may be one or more of a leveling agent and a defoaming agent. The leveling agent and defoaming agent used may be the same as described above.

In one embodiment, the additive may be contained in an amount ranging from 0.1 parts by weight to about 8 parts by weight based on 100 parts by weight of the second acrylic polyol resin. When the additive is contained in this content range, it will exhibit excellent leveling and defoaming properties without causing defects (such as cratering) on the surface of the color coating layer. For example, the additive may be contained in an amount of about 0.1, 0.5, 1, 2, 3, 4, 5, 6, 7 or 8 parts by weight.

In one embodiment, the color coating layer 160 may be formed to have a thickness ranging from about 1 μm to about 500 μm. In this thickness range, the color coating layer may easily protect the surface of the real wood film, and may have excellent scratch resistance, weather resistance, water resistance, light resistance and chemical resistance. For example, the color coating layer may be formed to have a thickness of about 15 μm to about 50 μm. As another example, it may be formed to have a thickness of about 20 μm to about 25 μm.

Figure 6:
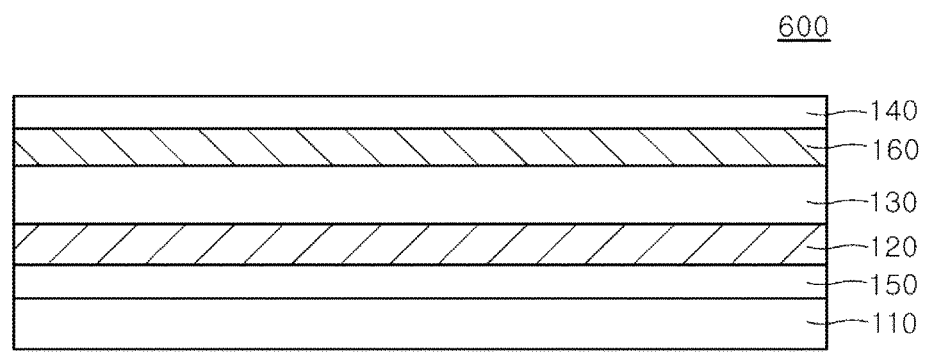
FIG. 6 illustrates a real wood film according to yet another embodiment of the present invention.

FIG. 6 illustrates a real wood film according to still another embodiment of the present invention. Referring to FIG. 6, when a real wood film 600 according to another embodiment of the present invention comprises a reinforcement layer, the real wood film 600 may further comprise an injected resin layer 110 formed on the lower surface of the reinforcement layer 150.

Injected Resin Layer

The injected resin layer 110 may be included for the purpose of ensuring the physical strength, impact resistance and heat resistance of the real wood film.

In other embodiments of the present invention, when the real wood film comprises the reinforcement layer, the injected resin layer may be formed on the lower surface of the reinforcement layer.

In one embodiment, the injected resin layer 110 may be formed by injecting an injection resin onto the lower surface of the elastic binder layer and curing the injected resin. In other embodiments, the injected resin layer may be formed by injecting an injection resin onto the lower surface of the reinforcement layer and curing the injected resin.

In one embodiment, the injection resin may comprise one or more of acrylonitrile-butadiene-styrene (ABS) resin, a polycarbonate/acrylonitrile-butadiene-styrene copolymer (PC/ABS) resin, and polyolefin resin. In one embodiment, the polyolefin resin may comprise one or more of polyethylene resin and polypropylene resin. For example, the injection resin may comprise PC/ABS resin. When the PC/ABS resin is used, the real wood film may have excellent impact resistance, heat resistance, rigidity and formability.

In one embodiment, the injected resin layer 110 may have a thickness ranging from about 1.5 mm to about 5 mm. In this thickness range, the real wood film may have all excellent impact resistance, heat resistance, rigidity and formability. For example, the thickness of the injected resin layer may be about 2 mm to about 3 mm.

When the real wood film according to the present invention is applied, the process for manufacturing the real wood film may be simplified compared to a conventional real wood film manufacturing process, so that the real wood film may be manufactured to have a thin film. Thus, the real wood film according to the present invention may have excellent processability (such as curved surface formation), is significantly light in weight, is manufactured with high productivity, and is manufactured at reduced costs so as to be cost-effective. In addition, the real wood film according to the present invention may exhibit excellent physical strength, light resistance, moisture resistance, heat resistance, weather resistance and scratch resistance.

Method for Manufacturing Real Wood Film

Figure 7:
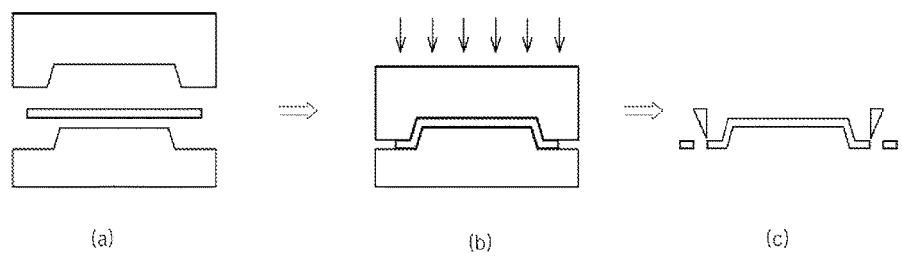
FIG. 7 illustrates a method for manufacturing a real wood film according to an embodiment of the present invention.

Another aspect of the present invention is directed to a method for manufacturing a real wood film. FIG. 7 illustrates a method for manufacturing a real wood film according to one embodiment of the present invention. Referring to FIG. 7, the method for manufacturing the real wood comprises: (a) an elastic binder layer-forming step; and (b) a press-forming step. More specifically, the method for manufacturing the real wood comprises the steps of: (a) forming an elastic binder layer on the lower surface of a real wood sheet; (b) press-forming the real wood sheet having the elastic binder layer formed thereon.

Hereinafter, each step of the method for manufacturing the real wood according to the present invention will described in detail.

(a) Elastic Binder Layer-Forming Step

This step is a step of forming an elastic binder layer on the lower surface of a real wood sheet. In one embodiment, the real wood sheet used may be the same as described above, and may have a thickness ranging from about 0.1 mm to about 1 mm. In this thickness range, the real wood film may have an excellent appearance, and the backside of the real wood sheet may be prevented. For example, the real wood sheet may have a thickness of about 0.3 mm to about 0.4 mm.

In one embodiment, the elastic binder layer comprises at least one of thermoplastic urethane (TPU) resin and acrylonitrile-butadiene-styrene (ABS) resin. When this kind of resin is used, the elastic binder layer may have both excellent elasticity and adhesive strength, the elastic binder layer may have both excellent elastic and adhesive properties to prevent the real wood layer from being damaged by external impact and from being cracked by shrinkage and expansion, and may also be easily bonded to a resin as described below.

In one embodiment, the elastic binder layer may be formed by applying to the lower surface of the real wood sheet a binder composition comprising at least one of thermoplastic polyurethane resin and ABS resin, followed by drying. Alternatively, it may be formed by laminating a film-type elastic binder on the lower surface of the real wood sheet.

In one embodiment, the elastic binder layer may be formed to have a thickness ranging from about 0.1 mm to about 1 mm. In this thickness range, the elastic binder layer may have excellent adhesive properties, impart elasticity to the real wood film, and prevent damage such as cracking, while the real wood film may have a minimized thickness and excellent formability. For example, the elastic binder layer may be formed to have a thickness of about 0.3 mm to about 0.4 mm.

In one embodiment, the real wood sheet having the elastic binder layer formed thereon may be cut into a predetermined shape. For example, it may be cut into a shape determined considering the predicted final product size. For example, the real wood sheet having the elastic binder layer formed thereon may be cut using a laser.

(b) Press-Forming Step

This step is a step of press-forming or preforming the real wood sheet having the elastic binder layer formed thereon into a predetermined shape. Referring to FIGS. 7(*a*) and 7(*b*), the press-forming may comprise placing in a pressing mold the real wood sheet having the elastic binder layer formed thereon, followed by hot-press molding. The hot-press molding may comprise in a preheated pressing mold the real wood sheet having the elastic binder layer formed thereon, and pressing the placed sheet, followed by cooling.

In one embodiment, the mold may be preheated to a temperature between about 100° C. and about 200° C., and the pressing may comprise applying a pressure of about 20 bar to about 50 bar to the real wood sheet and the elastic binder layer. Under such conditions, the real wood film may have excellent physical strength and appearance properties.

In one embodiment of the present invention, the method for manufacturing the real wood film may further comprise, before the press forming, a step of forming a reinforcement layer on the lower surface of the elastic binder layer. In one embodiment, the reinforcement layer may be formed by laminating a sheet-type reinforcement member on the lower surface of the elastic binder layer.

The reinforcement member may be laminated by a conventional method. For example, the reinforcement layer may be formed by laminating the reinforcement member on the lower surface of the elastic binder layer by use of an infrared heater or the like.

As the reinforcement member, the above-described nonwoven fabric may be used. In one embodiment, the reinforcement layer may have a thickness ranging from about 0.05 mm to about 0.5 mm. In this thickness range, the real wood film may have both excellent rigidity and formability. For example, the thickness may be about 0.15 mm to about 0.25 mm.

Referring to FIG. 7(*c*), in one embodiment of the present invention, a trimming process of milling the end of the press-formed real wood sheet to remove an unnecessary part may be performed.

Figure 8:
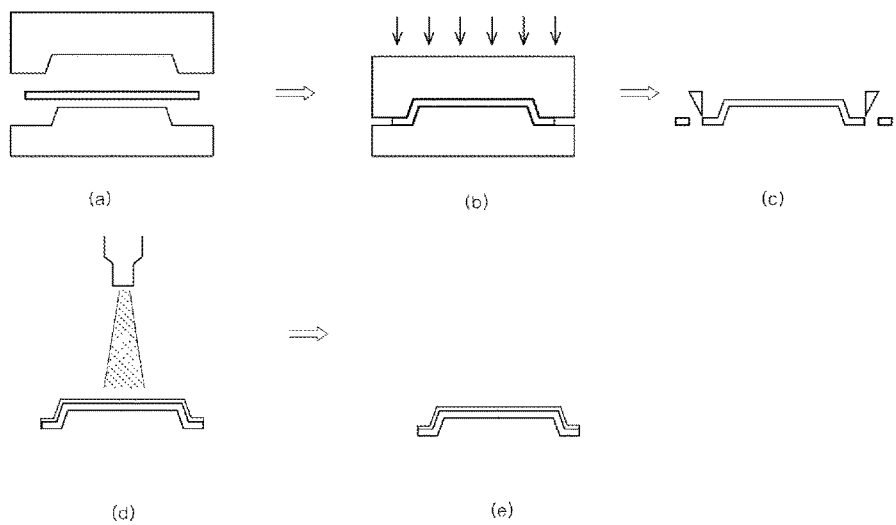
FIG. 8 illustrates a method for manufacturing a real wood film according to another embodiment of the present invention.

FIG. 8 illustrates a method for manufacturing a real wood film according to another embodiment of the present invention. Referring to FIG. 8, a method for manufacturing a real wood film according to another embodiment of the present invention may further comprise a step of forming a transparent coating layer.

(c) Transparent Coating Layer-Forming Step

Step (c) of forming the transparent coating layer may be a step of applying to the upper surface of the press-formed real wood sheet a transparent coating layer-forming composition comprising a first acrylic polyol resin, cellulose ester, a light stabilizer and an isocyanate-based curing agent, and curing the applied composition, thereby forming a transparent coating layer.

Referring to FIGS. 8(*d*) and 8(*e*), a transparent coating layer may be formed by applying to the upper surface of the press-formed real wood sheet a transparent coating layer-forming composition comprising a first acrylic polyol resin, cellulose ester, a light stabilizer and an isocyanate-based curing agent, and curing the applied composition. Application of the transparent coating layer-forming composition may be performed a plurality of times.

In one embodiment, the transparent coating layer-forming composition may be either a one-pack type composition comprising the above-described components, or a two-pack type composition consisting of: a first pack comprising the first acrylic polyol resin, the cellulose ester and the light stabilizer; and a second pack comprising the isocyanate-based curing agent. For example, it may be a two-pack type composition.

In one embodiment, the transparent coating layer-forming composition may comprise 100 parts by weight of the first acrylic polyol resin, about 3 parts by weight to about 20 parts by weight of the cellulose ester, about 0.1 parts by weight to about 20 parts by weight of the light stabilizer, and about 0.1 parts by weight to about 15 parts by weight of the isocyanate-based curing agent.

In other embodiments, the transparent coating layer-forming composition may comprise 100 parts by weight of the first acrylic polyol resin, about 3 parts by weight to about 15 parts by weight of the cellulose ester, about 5 parts by weight to about 15 parts by weight of the light stabilizer, and about 5 parts by weight to about 15 parts by weight of the isocyanate-based curing agent.

The components of the transparent coating layer-forming composition may be the same as described above.

In one embodiment, the transparent coating layer-forming composition may further comprise a matting agent, a curing accelerator and a solvent.

In one embodiment, the transparent coating layer-forming composition may further comprise, based on 100 parts by weight of the first acrylic polyol resin, about 3 parts by weight to about 15 parts by weight of a matting agent, about 0.001 parts by weight to about 5 parts by weight of a curing accelerator, and about 30 parts by weight to about 150 parts by weight of a solvent. For example, it may further comprise about 3 parts by weight to about 12 parts by weight of a matting agent, about 0.01 parts by weight to about 0.3 parts by weight of a curing accelerator, and about 55 parts by weight to about 95 parts by weight of a solvent.

In another embodiment of the present invention, the transparent coating layer-forming composition may further comprise an additive. In one embodiment, the additive may comprise one or more of a leveling agent and a defoaming agent.

In one embodiment, the additive may be contained in an amount of about 0.1 parts by weight to about 8 parts by weight based on 100 parts by weight of the first acrylic polyol resin. For example, it may be contained in an amount of about 1 parts by weight to about 5 parts by weight.

In one embodiment, the transparent coating layer may be formed by applying the transparent coating layer-forming composition to the upper surface of the real wood sheet in an amount of about 100 g/m² to about 120 g/m². Under this condition, the transparent coating layer may have a suitable thickness and excellent physical strength.

In one embodiment, the transparent coating layer may be formed by drying the applied composition at a temperature between about 45° C. and about 65° C. For example, the transparent coating layer may be formed by allowing the applied composition to stand at room temperature (20° C. to 25° C.) for about 30 minutes to about 1 hour, followed by drying at about 45° C. to about 65° C. for about 30 minutes to about 2 hours.

In one embodiment, the transparent coating layer may be formed to have a thickness of about 1 μm to about 500 μm. In this thickness range, the transparent coating layer may easily protect the surface of the real wood film, and may have excellent scratch resistance, weather resistance, water resistance, light resistance and chemical resistance. For example, the transparent coating layer may be formed to have a thickness of about 15 μm to about 50 μm. As another example, it may be formed to have a thickness of about 20 μm to about 25 μm.

In one embodiment, before the transparent coating layer-forming composition is applied, the upper surface of the real wood sheet may be polished (sanded). For example, foreign matter may be removed from the upper surface of the real wood sheet by use of sand paper (#320, #400, etc.) or a scrubber.

Figure 9:
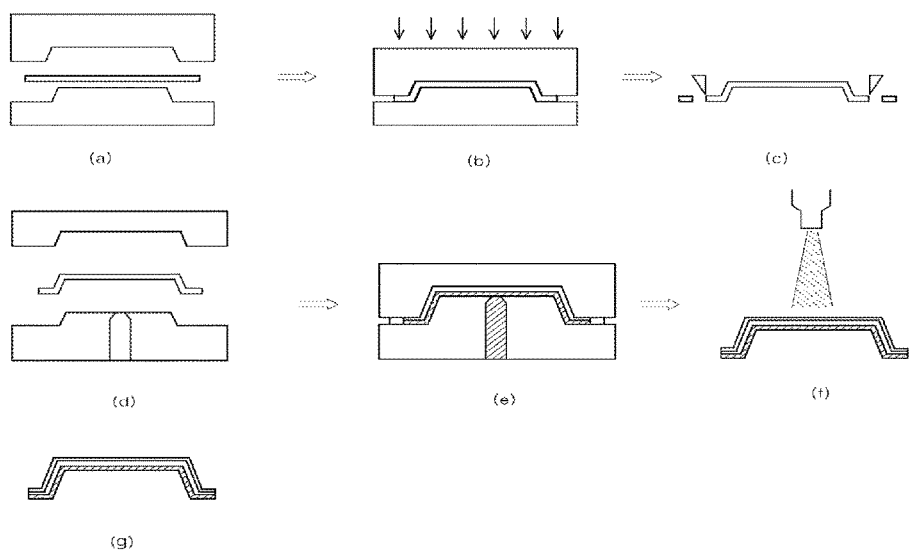
FIG. 9 illustrates a method for manufacturing a real wood film according to still another embodiment of the present invention.

FIG. 9 illustrates a method for manufacturing a real wood film according to another embodiment of the present invention. Referring to FIG. 9, a method for manufacturing a real wood film according to another embodiment of the present invention may further comprise, after the press-forming step, but before application of the transparent coating layer-forming composition, a step of forming an injected resin layer on the lower surface of the elastic binder layer.

In one embodiment, the reinforcement layer may be formed on the lower surface of the elastic binder layer, and then the injected resin layer may be formed on the lower surface of the reinforcement layer.

In one embodiment, the injected resin may comprise one or more of acrylonitrile-butadiene-styrene (ABS) resin, a polycarbonate/acrylonitrile-butadiene-styrene copolymer (PC/ABS) resin, and polyolefin resin. In one embodiment, the polyolefin resin may comprise one or more of polyethylene resin and polypropylene resin. For example, the injected resin may comprise PC/ABS resin. When the PC/ABS resin is used, the real wood film may have excellent impact resistance, heat resistance, rigidity and formability.

Referring to FIGS. 9(d) and 9(e), in one embodiment of the present invention, the injected resin layer may be formed by a method comprising the steps of: placing the press-formed real wood sheet between an upper injection mold and a lower injection mold; closing the upper injection mold and the lower injection mold in such a manner that a space is formed between the real wood sheet and the lower injection mold; and injecting an injection resin into the space through a gate provided in the lower mold, and curing the injected resin.

In one embodiment, the space may be formed using a slide member provided in the upper injection mold or the lower injection mold, after spacing the upper mold and the lower mold apart from each other at a distance corresponding to the thickness of the injected resin layer. In one embodiment, the space may have a height of about 1.5 mm to about 5 mm. For example, it may have a height of about 2 mm to about 3 mm.

Although not shown in the figure, in one embodiment of the present invention, a trimming process of milling the end of the press-formed real wood sheet to remove an unnecessary part may be performed.

The real wood film according to the present invention makes it possible to simplify a conventional real wood manufacturing process by omitting a process of laminating an aluminum reinforcement layer and a plurality of real wood sheets.

Although not shown in the figure, in another embodiment of the present invention, the method may further comprise, before formation of the transparent coating layer, a step of applying to the upper surface of the real wood sheet a color coating layer-forming composition comprising a second acrylic polyol resin, a cellulose ester, a light stabilizer, a pigment and an isocyanate-based curing agent, and drying the applied composition.

The color coating layer-forming composition comprises a second acrylic polyol resin, a cellulose ester, a light stabilizer, a pigment and an isocyanate-based curing agent. In one embodiment, the color coating layer-forming composition used may be a one-pack type composition comprising the above-described components. In another embodiment, the color coating layer-forming composition used may be a two-pack type composition consisting of: a first pack comprising the second acrylic polyol resin, the cellulose ester, the light stabilizer and the pigment; and a second pack comprising the isocyanate-based curing agent. For example, it may be a two-pack type composition. When the color coating layer is formed using the color coating layer-forming composition, the composition will be dried quickly, and the color coating layer will have excellent adhesion to the upper surface of the real wood layer, can protect the real wood layer, and may serve to mediate the adhesion between the transparent coating layer and the real wood layer.

In one embodiment, the color coating layer-forming composition may comprises 100 parts by weight of the second acrylic polyol resin, about 3 parts by weight to about 20 parts by weight of the cellulose ester, about 0.1 parts by weight to about 20 parts by weight of the light stabilizer, about 10 parts by weight to about 40 parts by weight of the pigment, and 0.1 parts by weight to about 15 parts by weight of the isocyanate-based curing agent.

In another embodiment, the color coating layer-forming composition may comprises 100 parts by weight of the second acrylic polyol resin, about 3 parts by weight to about 15 parts by weight of the cellulose ester, about 5 parts by weight to about 15 parts by weight of the light stabilizer, about 15 parts by weight to about 25 parts by weight of the pigment, and 5 parts by weight to about 15 parts by weight of the isocyanate-based curing agent.

The components of the color coating layer-forming composition may be the same as described above.

In one embodiment, the color coating layer-forming composition may further comprise a polishing agent, a curing accelerator and a solvent. In one embodiment, the color coating layer-forming composition may further comprise, based on 100 parts by weight of the second acrylic polyol resin, about 3 parts by weight to about 15 parts by weight of the polishing agent, about 0.001 parts by weight to about 5 parts by weight of the curing accelerator and about 30-150 parts by weight of the solvent. For example, the composition may further comprise, based on 100 parts by weight of the second acrylic polyol resin, about 3 parts by weight to about 12 parts by weight of the polishing agent, about 0.001 parts by weight to about 0.3 parts by weight of the curing accelerator and about 55 parts by weight to about 95 parts by weight of the solvent.

In another embodiment of the present invention, the color coating layer-forming composition may further comprise an additive. In one embodiment, the additive may comprise one or more of a leveling agent and a defoaming agent.

In one embodiment, the additive may be contained in an amount of about 0.1 parts by weight to about 8 parts by weight based on 100 parts by weight of the second acrylic polyol resin.

In one embodiment, the color coating layer-forming composition may be applied to the upper surface of the real wood sheet in an amount of about 100 g/m$^2$ to about 120 g/m$^2$, thereby forming a color coating layer. Under this condition, the transparent coating layer may have a suitable thickness and excellent physical strength.

In one embodiment, the transparent coating layer may be formed by drying the applied composition at a temperature between about 45° C. and about 65° C. For example, the transparent coating layer may be formed by allowing the applied composition to stand at room temperature (20° C. to 25° C.) for about 30 minutes to about 1 hour, followed by drying at about 45° C. to about 65° C. for about 30 minutes to about 2 hours.

In one embodiment, the color coating layer may be formed by applying the color coating layer-forming composition to the upper surface of the real wood sheet in an amount of about 100 g/m$^2$ to about 120 g/m$^2$. Under this condition, the transparent coating layer may have a suitable thickness and excellent physical strength.

In one embodiment, the transparent coating layer may be formed to have a thickness of about 1 µm to about 500 µm. In this thickness range, the transparent coating layer can easily protect the surface of the real wood film, and may have excellent scratch resistance, weather resistance, water resistance, light resistance and chemical resistance. For example, the transparent coating layer may be formed to have a thickness of about 15 µm to about 50 µm. As another example, it may be formed to have a thickness of about 20 µm to about 25 µm.

In one embodiment, after formation of the color coating layer, the surface of the color coating layer may be polished (sanded) to remove rough cellulosic matter and the like from the surface of the color coating layer, and then the above-described transparent coating layer may be formed.

Molded Article Comprising Real Wood Film

Another aspect of the present invention is directed to a molded article comprising the real wood film. The molded article may be a car interior article.

Hereinafter, preferred examples of the present invention will be described in further detail. It is to be understood, however, that these examples are for illustrative purposes only and are not intended to limit the scope of the present invention. The contents not described herein can be readily envisioned by those skilled in the art, and thus the description thereof is omitted.

Examples and Comparative Examples

Transparent Coating Layer-Forming Composition

The details of the components of transparent coating layer-forming compositions used in Examples and Comparative Examples are as follows.

(A) First acrylic polyol resin: (A1) a thermosetting acrylic polyol resin having a solid content of 50%, a hydroxyl (OH) value of 60 mg KOH/g, a weight-average molecular weight of about 7,000 g/mol and a glass transition temperature (Tg) of 45° C. was used. (A2) a thermosetting acrylic polyol resin having a solid content of 50%, a hydroxyl (OH) value of 50 mg KOH/g, a weight-average molecular weight of about 10,000 g/mol and a glass transition temperature (Tg) of 70° C. was used. (A3) a thermosetting acrylic polyol resin having a solid content of 48%, a hydroxyl (OH) value of 100 mg KOH/g, a weight-average molecular weight of about 12,000 g/mol and a glass transition temperature (Tg) of 20° C. was used.

(B) Cellulose ester: cellulose acetate butyrate (CAB) was used.

(C) Light stabilizer: a light stabilizer comprising a hindered-amine light stabilizer (HALS) was used.

(D) Isocyanate-based curing agent: a polyisocyanate-based curing agent (hexamethylene diisocyanate) was used.

(E) Matting agent: A silica-based matting agent having a size of 2-4 μm was used.

(F) Curing accelerator: dibutyltin dilaurate (DBTL) as an organometallic tin compound was used.

(G) Solvent: methyl ethyl ketone was used.

(H) Additive: a polyether-modified polysiloxane as a leveling agent was used.

The above-described components were prepared with the contents shown in Table 1 below, and two-pack type, thermosetting, transparent coating layer-forming compositions were prepared which each comprises: a first pack consisting of a mixture of the first acrylic polyol resin (A), the cellulose ester (B), the light stabilizer (C), the matting agent (E), the curing accelerator (F), the solvent (G) and the additive (H); and a second pack consisting of a mixture of the isocyanate-based curing agent (D) and the solvent (methyl ethyl ketone), mixed at a weight of 1:2.85.

TABLE 1

| Component (unit: parts by weight) | | Example | Comparative Example 1 | Comparative Example 2 |
|---|---|---|---|---|
| (A) | (A1) | 100 | 40 | — |
|     | (A2) | — | — | 100 |
|     | (A3) | — | 60 | — |
| (B) |     | 8.5 | 8.0 | 8.5 |
| (C) |     | 12.8 | 8.0 | 12.8 |
| (D) |     | 11.1 | 10.4 | 11.1 |
| (E) |     | 9.6 | 9.0 | 9.6 |
| (F) |     | 0.2 | 0.2 | 0.2 |
| (G) |     | 78.5 | 71.8 | 78.5 |
| (H) |     | 3.2 | 3.0 | 3.2 |

Color Coating Layer-Forming Composition

The details of the components of color coating layer-forming compositions used in Examples and Comparative Examples are as follows.

(A) Second acrylic polyol resin: (A1) a thermosetting acrylic polyol resin having a solid content of 50%, a hydroxyl (OH) value) of 60 mg KOH/g, a weight-average molecular weight of about 7,000 g/mol and a glass transition temperature (Tg) of 45° C. was used. (A2) a thermosetting acrylic polyol resin having a solid content of 50%, a hydroxyl (OH) value of 50 mg KOH/g, a weight-average molecular weight of about 10,000 g/mol and a glass Transition temperature (Tg) of 70° C. was used. (A3) a thermosetting acrylic polyol resin having a solid content of 48%, a hydroxyl (OH) value of 100 mg KOH/g, a weight-average molecular weight of about 12,000 g/mol and a glass transition temperature (Tg) of 20° C. was used.

(B) Cellulose ester: cellulose acetate butyrate (CAB) was used.

(C) Light stabilizer: a light stabilizer comprising a hindered amine light stabilizer (HALS) was used.

(D) Pigment: a pigment comprising isoindoline (pigment yellow 139) as a yellow pigment, DPP (pigment red 264) as a red pigment and carbon black (pigment black 7) as a black pigment was used.

(E) Isocyanate-based curing agent: a polyisocyanate-based curing agent (hexamethylene diisocyanate) was used.

(F) Polishing agent: zinc stearate was used.

(G) Curing accelerator: dibutyltin dilaurate (DBTL) as an organometallic tin compound was used.

(H) Solvent: methyl ethyl ketone was used.

(I) Additive: Polyether-modified polysiloxane as a leveling agent was used.

The above-described components were prepared with the contents shown in Table 2 below, and two-pack type color coating layer-forming compositions were prepared, which each comprises: a first pack consisting of a mixture of the second acrylic polyol resin (A), the cellulose ester (B), the light stabilizer (C), the pigment (D), the polishing agent (F), the curing accelerator (G), the solvent (H) and the additive (I); and a second pack consisting of a mixture of the isocyanate-based curing agent (E) and the solvent (methyl ethyl ketone), mixed at a weight ratio of 1:2.85.

TABLE 2

| Component (unit: parts by weight) | | Example | Comparative Example 1 | Comparative Example 2 |
|---|---|---|---|---|
| (A) | (A1) | 100 | 40 | — |
|     | (A2) | — | — | 100 |
|     | (A3) | — | 60 | — |
| (B) |     | 8 | 8 | 8 |
| (C) |     | 12 | 8 | 12 |
| (D) |     | 20 | 20 | 20 |
| (E) |     | 10.4 | 10.4 | 10.4 |
| (F) |     | 4 | 4 | 4 |
| (G) |     | 0.2 | 0.2 | 0.2 |
| (H) |     | 55 | 59 | 55 |
| (I) |     | 0.8 | 0.8 | 0.8 |

EXAMPLE

A real wood sheet having a thickness of 0.3 mm was prepared, and an ABS sheet having a thickness of 0.3 mm was laminated on the lower surface of the real wood sheet to form an elastic binder layer. Then, a polyethylene terephthalate (PET) nonwoven fabric having a thickness of 0.2 mm was laminated on the lower surface of the elastic binder layer to form a reinforcement layer.

Next, the real wood sheet having the reinforcement layer formed thereon was placed in a press mold pretreated to a temperature between 100° C. and 200° C., and was press-formed at a pressure of 20-50 bar. Then, the end of the real wood sheet was trimmed (milled) to remove an unnecessary part.

The trimmed real wood sheet was placed between an upper injection mold and a lower injection mold, and the upper injection mold and the lower injection mold were closed in such a manner that a space having a thickness of 2 mm was formed between the lower surface of the reinforcement layer of the real wood sheet and the lower injection mold. Following this, PC-ABS resin was injected into the space through a gate provided in the lower injection mold and was cured, thereby forming an injected resin layer having a thickness of 2 mm.

Next, the upper surface of the real wood sheet was polished with sandpaper to remove foreign matter and rough fiber, and a two-pack type, color coating layer-forming composition was applied to the upper surface of the real wood sheet in an amount of 100-120 g/m². The applied composition was allowed to stand at room temperature (20 to 25° C.) for 30 minutes and dried at 50 to 60° C. for 1 hour, thereby forming a color coating layer having a thickness of 20-25 μm. Next, the upper surface of the color coating layer was polished with sandpaper to remove foreign matter, and the two-pack type, transparent coating layer-forming composition was applied thereto, allowed to stand at room temperature (20° C. to 25° C.) for 30 minutes, and dried at a temperature of 50° C. to 60° C. for 1 hour, thereby forming a transparent coating layer having a thickness of 20-25 µm. In this way, a real wood film was manufactured.

Comparative Examples 1 and 2

Real wood films were manufactured in the same manner as described in the Example, except that each of color coating layer-forming compositions and transparent coating layer-forming compositions, having the components and contents shown in Tables 1 and 2, was applied.

Test Example

The physical properties of the real wood films manufactured in the Example and the Comparative Examples were measured in the following manner, and the results of the measurement are shown in Table 3 below.

(1) Scratch resistance: for the Example and Comparative Examples 1 and 2, a load of 500 g was applied to each real wood film, and in this state, the surface of each real wood film was scratched with a sapphire needle having a curvature radius of 0.5R at an angle of 60° and a speed of 100 mm/sec, and was visually observed. Scratch resistance was graded on a five-point scale of 1 (showing a severe scratch) to 5 (showing no scratch). A film sample scored grade 3 (showing only a fine scratch) or higher was judged as "pass", and a film sample scored lower than grade 3 was judged as "fail".

(2) Abrasion resistance: for the Example and Comparative Examples 1 and 2, in accordance with JIS L3102, double-sided duck #10 (20 mm×20 mm) was placed on the surface of each film sample, and a weight with a load of 1 kg was reciprocated 10000 times on the surface of each film sample at a speed of 300 mm/sec. Whether or not abrasion of the surface occurred was observed. When abrasion of the surface did not occur, the film sample was judged as "pass", and when abrasion of the surface occurred, the film sample was judged as "fail".

(3) Sun cream resistance: for the Example and Comparative Examples 1 and 2, 0.25 g of sun cream was applied to cotton cloth and allowed to stand for 5 minutes so as to penetrate the cotton cloth. The cotton cloth was placed on the surface of each film sample, and then an acryl plate having a size of 50 mm×50 mm×3 mm was pressed against the cotton cloth so that the sun cream would be applied to the surface of the film sample. Then, the sample was allowed to stand in an oven at 80° C. for 1 hour, after which the cotton cloth and the acryl plate were removed, and the surface of the sample was washed with a neutral detergent, followed by drying. The state of the coating layer surface of the sample was observed, and when the color coating layer or the transparent coating layer was not exfoliated, the sample was judged as "pass", and when the coating layer was exfoliated, the sample was judged as "fail".

(4) Chemical resistance: for the Example and Comparative Examples 1 and 2, gauze was sufficiently wet with unleaded gasoline, glossy wax, glass cleaner, ethyl alcohol (EtOH) and industrial acetone, and then each film sample was rubbed 10 times with the gauze so that the chemicals would be applied to the surface of the film sample. Next, the sample was allowed to stand at 80° C. for 3 hours, and then whether or not the surface of the real wood film sample was colored was observed. When the surface was colored, the film sample was judged as "pass", and the surface was not colored, the sample was judged as "fail".

(5) Light resistance ($\Delta E$): for the Example and Comparative Examples 1 and 2, in accordance with SAE 31885 standards, each film sample was exposed to a light dose of 1050 kJ/m$^2$ by use of a xenon arc whether tester, and then the sample was observed to measure the color difference ($\Delta E$). When the color difference ($\Delta E$) was 2 or more, the sample was judged as "pass", and the color difference was less than 2, the sample was judged as "fail".

(6) Heat resistance: for the Example and Comparative Examples 1 and 2, each film sample was allowed to stand at 90° C. for 300 hours, and then whether or not there was discoloration, fading, swelling, splitting, reduced gloss or reduced adhesion in the sample was observed. When this phenomenon did not occur, the sample was judged as "pass", and when this phenomenon occurred, the sample was judged as "fail".

(7) Temperature cycle test: for the Example and Comparative Examples 1 and 2, each film sample was subjected to three cycles, each consisting of heat treatment at 80±2° C. for 3 hours→keeping at room temperature for 1 hour→cooling at −40° C. for 3 hours→keeping at room temperature for 1 hour→heat treatment at 50±2° C. and 95% relative humidity (RH) for 7-15 hours→keeping at room temperature for 1 hour. Next, after the sample was kept at room temperature for 1 hour, the surface state of the color coating layer and the transparent coating layer was examined, and immediately an adhesion test was performed. In addition, the surface state of the sample was examined for each cycle, and when the color coating layer or the transparent coating layer was not exfoliated, the sample was judged as "pass", and when the color coating layer or the transparent coating layer was exfoliated, the sample was judged as "fail". In addition, the degree of discoloration of the sample was also observed.

(8) Moisture resistance: for the Example and Comparative Examples 1 and 2, each film sample was allowed to stand at 50° C. and 98% RH for 168 hours, and then the sample surface and the degree of discoloration were observed. When discoloration, fading, swelling, splitting or reduced gloss did not occur, the sample was judged as "pass", and when this phenomenon occurred, the sample was judged as "fail".

TABLE 3

|  | Example | Comparative Example 1 | Comparative Example 2 |
| --- | --- | --- | --- |
| Scratch resistance | Pass | Pass | Pass |
| Abrasion resistance | Pass | Pass | Pass |
| Sun cream resistance | Pass | Pass | Pass |
| Chemical resistance | Pass | Pass | Pass |
| Light resistance ($\Delta E$) | Pass (5) | Fail (1.5) | Pass (5) |
| Heat resistance | Pass | Pass | Pass |
| Temperature cycle test | Pass | Fail (coating layer exfoliated) | Pass |
| Moisture resistance | Pass | Pass | Fail (grain bursting of wood sheet) |

As can be seen in Table 3 above, the real wood film of the Example, which comprises the color coating layer-forming composition and the transparent coating layer-forming composition according to the embodiment of the present invention, showed excellent scratch resistance, abrasion resistance, light resistance and heat resistance, whereas the real wood films of Comparative Examples 2, which employ the first and second acrylic polyol resins having a glass transition temperature out of the range specified in the present invention, showed reduced light resistance, heat resistance, moisture resistance or temperature cycle properties compared to those of the Example.

Although some embodiments have been provided to illustrate the present disclosure in conjunction with the drawings, it will be apparent to those skilled in the art that the embodiments are given by way of illustration only, and that various modifications and equivalent embodiments can be made without departing from the spirit and scope of the present disclosure. The scope of the present disclosure should be limited only by the accompanying claims.

What is claimed is:

1. A real wood film comprising:
 a real wood layer;
 a transparent coating layer formed over an upper surface of the real wood layer;
 a color coating layer formed between the transparent coating layer and the real wood layer; and
 an elastic binder layer formed over a lower surface of the real wood layer,
 wherein the elastic binder layer comprises at least one of thermoplastic polyurethane (TPU) and acrylonitrile-butadiene-styrene (ABS) resins,
 wherein the transparent coating layer is formed by applying and drying a transparent coating layer-forming composition comprising 100 parts by weight of a first acrylic polyol resin, about 3 parts by weight to about 10 parts by weight of a cellulose ester, about 0.1 parts by weight to about 20 parts by weight of a light stabilizer, about 0.01 parts by weight to about 0.3 parts by weight of a curing accelerator and about 0.1 parts by weight to about 15 parts by weight of an isocyanate-based curing agent,
 wherein the first acrylic polyol resin has a glass transition temperature (Tg) between about 35° C. and about 55° C.,
 wherein the color coating layer is formed by applying and drying a color coating layer-forming composition comprising 100 parts by weight of a second acrylic polyol resin, about 3 parts by weight to about 10 parts by weight of a cellulose ester, about 5 parts by weight to about 15 parts by weight of a light stabilizer, about 15 parts by weight to about 25 parts by weight of a pigment, about 0.01 parts by weight to about 0.3 parts by weight of a curing accelerator and about 5 parts by weight to about 15 parts by weight of an isocyanate-based curing agent,
 wherein the second acrylic polyol resin has a glass transition temperature (Tg) between about 35° C. and about 55° C.

2. The real wood film of claim 1, further comprising a reinforcement layer formed over a lower surface of the elastic binder layer.

3. The real wood film of claim 1, further comprising an injected resin layer formed over a lower surface of the elastic binder layer.

4. The real wood film of claim 1, wherein the first acrylic polyol resin has a weight-average molecular weight of about 3,500 g/mol to about 10,000 g/mol and a hydroxyl (OH) value of about 45 mg KOH/g to about 65 mg KOH/g.

5. The real wood film of claim 1, wherein the transparent coating layer-forming composition further comprises one or more of a matting agent, a curing accelerator and a solvent.

6. The real wood film of claim 1, wherein the transparent coating layer-forming composition further comprises an additive, in which the additive comprises one or more of a leveling agent and a defoaming agent.

7. A molded article comprising a real wood film as set forth in claim 1.

8. The molded article of claim 7, wherein the molded article is a car interior article.

* * * * *